(12) United States Patent
Hurwitz (10) Patent No.: US 7,690,331 B2
(45) Date of Patent: Apr. 6, 2010

(54) ELECTROLUMINESCENT BRAIDED PET LEASH

(75) Inventor: Marni Markell Hurwitz, Far Hills, NJ (US)

(73) Assignee: Nite Glow Industries, Inc, Far Hills, NJ (US)

( * ) Notice: Subject to any disclaimer, the term of this patent is extended or adjusted under 35 U.S.C. 154(b) by 4 days.

(21) Appl. No.: 10/935,917

(22) Filed: Sep. 8, 2004

(65) Prior Publication Data
US 2006/0021585 A1 Feb. 2, 2006

Related U.S. Application Data

(60) Provisional application No. 60/591,938, filed on Jul. 28, 2004.

(51) Int. Cl.
*A01K 27/00* (2006.01)

(52) U.S. Cl. .................. 119/795; 119/796; 119/797

(58) Field of Classification Search ............. 119/792, 119/793, 795, 797, 712, 859, 135, 65, 856, 119/796
See application file for complete search history.

(56) References Cited

U.S. PATENT DOCUMENTS

| | | | | |
|---|---|---|---|---|
| 2,939,271 A * | 6/1960 | Nadel | ............ | 57/211 |
| 3,871,336 A | 3/1975 | Bergman | ............ | 119/106 |
| 3,884,190 A * | 5/1975 | Gurrey | ............ | 119/797 |
| 3,999,521 A | 12/1976 | Puiello | ............ | 119/96 |
| 4,167,156 A | 9/1979 | Kupperman et al. | ............ | 119/109 |
| 4,173,201 A | 11/1979 | Chao et al. | ............ | 119/106 |
| 4,377,988 A * | 3/1983 | Tung et al. | ............ | 119/654 |
| 4,384,548 A * | 5/1983 | Cohn | ............ | 359/518 |
| 4,407,233 A | 10/1983 | Bozzacco | ............ | 119/106 |
| 4,513,692 A | 4/1985 | Kuhnsman et al. | ............ | 119/109 |
| 4,763,985 A | 8/1988 | Bingham | ............ | 350/105 |
| 4,887,552 A * | 12/1989 | Hayden | ............ | 119/793 |
| 4,895,110 A | 1/1990 | LoCascio | ............ | 119/106 |
| 4,957,335 A | 9/1990 | Kuney, Jr. | ............ | 350/105 |
| 5,046,456 A | 9/1991 | Heyman et al. | ............ | 119/106 |
| 5,074,251 A | 12/1991 | Pennock | ............ | 119/106 |
| 5,117,304 A | 5/1992 | Huang et al. | ............ | 359/529 |
| 5,140,946 A | 8/1992 | Pennock et al. | ............ | 119/106 |
| 5,200,262 A | 4/1993 | Li | ............ | 428/266 |
| 5,237,448 A | 8/1993 | Spencer et al. | ............ | 119/792 |
| 5,243,457 A | 9/1993 | Spencer | ............ | 119/795 |
| 5,283,101 A | 2/1994 | Li | ............ | 428/141 |
| 5,370,082 A | 12/1994 | Wade | ............ | 119/859 |

(Continued)

*Primary Examiner*—Andrea M Valenti
(74) *Attorney, Agent, or Firm*—Ernest D. Buff & Associates, LLC; Ernest D. Buff; Margaret A LaCroix (57) ABSTRACT

A nylon or polypropylene cylindrical central braided rope core is wound with an electroluminescent wire to form a pet leash. The electroluminescent wire is powered by a portable power supply attached to the handle of the pet leash causing illumination of the electroluminescent wire continuously or intermittently at a selected blink rate. Alternatively, the wound electroluminescent wire surrounds a cylindrical braided reflective sleeve that covers the central braided rope. The cylindrical braided reflective sleeve reflects incident light back to its source while the electroluminescent illumination is provided. Reflection and illumination of light are omnidirectional. The braided construction of the central core and reflective sleeve, together with the configuration of the electroluminescent wire, resist tensile, twist and torsional forces, enabling reliable emission of omnidirectional illumination and reflectivity. In combination, the omnidirectional illumination and reflectivity, strength and flexibility provide a higher margin of safety for pets and their owners while walking in dimly lit environments where vehicles are encountered.

10 Claims, 2 Drawing Sheets

U.S. PATENT DOCUMENTS

| | | | |
|---|---|---|---|
| 5,429,075 A | 7/1995 | Passarella et al. | 119/795 |
| 5,485,355 A | 1/1996 | Voskoboinik et al. | 362/84 |
| 5,523,927 A | 6/1996 | Gokey | 362/103 |
| 5,535,106 A | 7/1996 | Tangen | 362/108 |
| 5,558,044 A | 9/1996 | Nasser, Jr. et al. | 119/796 |
| 5,630,382 A | 5/1997 | Barbera et al. | 119/859 |
| 5,701,848 A * | 12/1997 | Tozawa | 119/797 |
| 5,762,029 A | 6/1998 | DuBois et al. | 119/796 |
| 5,777,790 A | 7/1998 | Nakajima | 359/536 |
| 5,850,807 A | 12/1998 | Keeler | 119/799 |
| 5,962,108 A | 10/1999 | Nestegard et al. | 428/172 |
| 5,967,095 A * | 10/1999 | Greves | 119/795 |
| 6,070,556 A | 6/2000 | Edwards | 119/792 |
| 6,074,071 A * | 6/2000 | Baumberg et al. | 362/101 |
| 6,085,698 A * | 7/2000 | Klein | 119/859 |
| 6,170,968 B1 | 1/2001 | Caswell | 362/469 |
| 6,289,849 B1 | 9/2001 | Macedo et al. | 119/796 |
| 6,400,093 B1 | 6/2002 | Baumberg et al. | 315/169.3 |
| 6,557,498 B1 | 5/2003 | Smierciak et al. | 119/858 |
| 6,592,967 B2 * | 7/2003 | Kaufman | 428/156 |
| 6,877,889 B2 * | 4/2005 | Peng et al. | 362/570 |
| 6,925,967 B1 * | 8/2005 | Woodruff | 119/859 |
| 2006/0005785 A1 * | 1/2006 | Cooper | 119/795 |

* cited by examiner

ELECTROLUMINESCENT BRAIDED PET LEASH

This application claims the benefit of U.S. Provisional Application No. 60/591,938 entitled ELECTROLUMINESCENT BRAIDED PET LEASH, filed Jul. 28, 2004.

BACKGROUND OF THE INVENTION

1. Field of the Invention

The present invention relates to pet leashes; and more particularly, to an electroluminescene wire illuminated pet leash especially suited for use during dusk or nighttime hours to enhance the safety of pets and their owners while walking in dimly lit environments where rapidly moving vehicles are encountered.

2. Description of the Prior Art

Walking a pet during dusk or nighttime hours can be hazardous in neighborhoods where automobiles are encountered. Illuminating characteristics of the automobile headlamps, generally afford an illumination range of approximately 25 to 50 feet. This illumination range can be significantly reduced by mist or fog, or bends in the road. Despite improvements to vehicle headlights, pets and their owners are oftentimes not recognized by automobile drives until the distance between the automobile and the pet is small.

Several approaches devised by prior art workers attempt to provide solutions for this hazardous common activity. These approaches include 1) use of pet collars that are illuminated or reflective; 2) use of leashes which are illuminated or reflective; or 3) a combination of both features. None of these solutions suggest indicating the whereabouts of a pet owner, a leash and a pet attached to the leash via a flexible, spirally wound electroluminescent illuminator.

Various types of reflectively illuminated dog collars and leashes are known in the art. These reflectively illuminated dog collars and leashes are not equipped with batteries, light bulbs or other lighting elements; but depend instead on light from an external source to trigger reflective illumination. Rapidly moving vehicles, such as bikes, scooters, joggers and the like, encountered by pets and their owners while walking in dimly lit environments such as bike paths, country roads, parking garages and the like, are not always equipped with light emitting equipment. Within these environments, the advantages of power-illuminated dog collars and leashes over those of the reflective variety are readily apparent.

U.S. Pat. No. 3,871,336 to Bergman discloses a reflective dog collar which is not illuminated but which utilizes a highly reflective material in the form of dots of different colors that are encapsulated in plastic. U.S. Pat. No. 3,999,521 to Puiello discloses a reflective safety harness for quadruped animals. The safety harness includes a pair of identical sheet elements with a light reflective surface mounted on opposite sides of the animal. U.S. Pat. No. 4,167,156 to Kupperman et al. discloses a reflective animal leather leash with a transparent polyvinyl chloride strip having a light reflective prism design on one surface. U.S. Pat. No. 4,384,548 to Cohn discloses a safety device for animals via a pet collar. The pet collar utilizes "retro-reflective" threads with glass reflective elements in a flexible webbing to form a pet leash. U.S. Pat. No. 4,407,233 to Bozzaco discloses a safety collar for pets that has highly reflective flexible elements large enough in length to extend beyond the outer surface of the pet's hair. U.S. Pat. No. 6,070,556 to Edwards discloses an illuminating dog safety system that comprises a pet collar having a reflective strip that extends the majority of the collar's length. The safety system further comprises a harness adapted to be worn around an animal's torso and having upper and lower reflective straps.

Various types of illuminated dog collars are known in the art. Some of these heretofore devised and utilized illuminated dog collars employ bulb or other power sources for illumination. Representative dog collars of this variety are discussed below.

U.S. Pat. No. 4,173,201 to Chao, et al. discloses an illuminated collar for pets and the like. The disclosed collar is adapted to be worn by a dog, cat, or other domesticated animal. The collar includes a row of small electric lamps studded around the collar in a manner inducing visibility in darkness or subdued daylight. The circuitry includes a replaceable dry cell battery and a manually operated switch which is mounted on the collar. The disclosed collar is not illuminated by way of an electroluminescent wire illuminated device, but instead utilizes a bulb device.

U.S. Pat. No. 4,513,692 to Kuhnsman et al. discloses an illuminated pet leash comprising a non-opaque tube that contains one or more bundles of optical fibers. A light bulb is connected adjacent to the leash handle to shine light into the tube and illuminate the optical fibers therein. The pet leash is not illuminated by an electroluminescent wire device, but instead is illuminated by a fiber-optic illumination device. Specifically, the fiber-optic illumination device functions to redirect light from a bulb power source and not from an electroluminescent wire.

U.S. Pat. No. 4,895,110 to Lo Cascio (hereinafter, the '110 patent) discloses a pet collar that includes a light source and a power source attached to a strap. A closure device for the collar acts as a switch, such that power is provided to the light source to illuminate the collar when the ends of the collar are connected by the closure device. The light source utilized by the '110 patent is not that derived from an electroluminescent wire illuminated device.

U.S. Pat. No. 4,887,552 to Hayden discloses an electrically lighted pet leash that is composed of a transparent, flexible tube containing a string of small electric light bulbs mounted in parallel between two insulated wires. The leash is looped at one end to form a choker collar and at a second end to form a handle. The string of lights extends throughout the leash to illuminate both the collar and the handle. A small rechargeable battery is mounted adjacent to the handle for operating the lights. The patented device does not utilize an electroluminescent wire illuminated device, but rather utilizes a small bulb lighted device for illumination.

U.S. Pat. No. 5,046,456 to Heyman et al. discloses an illuminated pet collar in which multiple lights are mounted within a flexible, light-permeable tube that extends about the perimeter of the collar. A housing mounted on one end of the tube contains a circuit and a battery for operating the lights. This multiple light device does not use an electroluminescent wire illuminator in the pet leash.

U.S. Pat. Nos. 5,074,251 and 5,140,946 to Pennock et al. discloses an illuminated pet collar. The illuminable pet collar includes a housing for a battery power source and an elongated, flexible, pliable, transparent plastic display tube having a plurality of miniature lights spaced apart and operably connected therewithin along substantially the entire length of the display tube. The housing includes a stem or extension tube extending from each end thereof that is sized to be snugly inserted into each end of the display tube. Electrical connection between the battery and the outer surface of one stem communicates electrical power to the lights, which are parallel-wired within the display tube. The source of illumination does not involve an electroluminescent wire and instead the patent utilizes a miniature light illumination device.

U.S. Pat. No. 5,243,457 to Spencer discloses material with enhanced visibility characteristics. This flexible visibility enhancing material is provided combining the advantages of a light reflective component and a luminescent component. The material includes a first layer of prismatic light reflective plastic material having an underlying surface formed with a plurality of minute prism-like formations projecting therefrom at regular spaced intervals and an overlying substantially smooth light transmissive surface. Bonded, as by heat sealing, to the first layer is a second layer of plastic luminescent material contiguously and integrally attached to the underlying surface of the prism-like formations, and generally coextensive therewith. The visibility enhancing material simultaneously radiates luminescent light from the second layer, through the underlying surface of prism-like formations, and further through the smooth light transmissive surface. Light is reflected from the prism-like formations through the smooth light transmissive surface. In one embodiment, a leash for controlling and restraining a pet animal includes a flexible elongate member comprised of the visibility enhanced material. In another embodiment, the second layer is replaced with a layer of luminescent material, which can be selectively energized to become luminous. Since the transparent reflective material is a molded plastic of prismatic construction it is rigid with the electroluminescence light source positioned underneath the rigid transparent material. The disclosed device is inflexible and is not readily capable of being twisted and flexed. Furthermore, any twisting and bending action would result in separation of the reflective element from the luminescent element.

U.S. Pat. No. 5,237,448 to Spencer et al. discloses visibility enhancing material that combines the advantages of a light reflective component and a luminescent component. The material includes a first layer of prismatic light-reflective plastic material having an underlying surface formed with a plurality of minute prism-like formations that project therefrom at regular spaced intervals and an overlying substantially smooth light transmissive surface. A second layer of plastic luminescent material is contiguously and integrally attached to the underlying surface of prism-like formations and generally coextensive therewith. The visibility enhancing material simultaneously radiates luminescent light from the second layer through the underlying surface of the prism-like formations and through the smooth light transmissive surface. Light is reflected from the prism-like formations through the smooth light transmissive surface. In one embodiment, a leash for controlling and restraining a pet animal includes a flexible elongate member comprised of the visibility enhanced material. Since the transparent reflective material is a molded plastic of prismatic construction it is rigid with an electroluminescence light source positioned underneath the rigid transparent material. The leash device disclosed in the patent does not have flexible properties and therefore is not readily capable of being twisted and flexed. Further any twisting and bending action will undesirably cause the reflective element to separate from the luminescent element.

U.S. Pat. No. 5,370,082 to Wade (hereinafter, the '082 patent) discloses an animal collar that includes the utilization of illuminating devices. These illuminating devices include light emitting diodes, liquid quartz strips, or electric lamps. A plurality of solar cells are provided on the outside of the collar and function to recharge the power supply connected to the illuminating devices. The '082 patent does not utilize an electroluminescent wire illumination device, but rather utilizes light emitting diodes, liquid quartz strips, or electric lamps for illumination. U.S. Pat. No. 5,429,075 to Passarella et al. discloses a pet leash and flashlight combination. This flash light integrated pet leash is not an electroluminescent wire illuminated pet leash.

U.S. Pat. No. 5,523,927 to Gokey discloses an illuminated animal collar. The illuminated collar comprises: a collar for placement on an animal; at least one light emitting diode placed on the outer exterior of the collar to be visible when the collar is worn; a motion sensitive switch designed to respond to the motion of the animal an on/off switch to selectively turn on or off battery power to the circuit; a battery; a timing circuit; and a low battery power detection circuit. The light emitting diodes, motion sensitive switch, on/off switch, battery, timing circuit and low battery detection circuit are connected together. An intermittent flashing of the light emitting diodes will thus be established for constant movement. The low battery detection circuit sounds an audible alarm to warn the user of a low battery. The disclosed illuminated collar is illuminated by means of a diode and is not illuminated by way of an electroluminescent wire illuminated device. Furthermore, the patent does not disclose an illuminated pet leash.

U.S. Pat. No. 5,535,106 issued to Tangen discloses a lighted animal collar that includes a plurality of separate light emitting assemblies or housings at spaced intervals along the collar. Each of the assemblies includes a light emitting diode, battery source, reflectors and a translucent cover. This lighting assembly illuminated collar does not suggest an illuminated pet leash and collar. Moreover, the collar is not illuminated by way of an electroluminescent wire illuminated device.

U.S. Pat. No. 5,558,044 to Nasser, Jr. et al. discloses illumination of a leash handle by way of a flashlight. The flashlight is attached to the top portion of the handle, in a forward-facing direction, such that the light beam from the flashlight can be pointed in any desired direction by the hand holding the leash. The illumination device does not use an electroluminescent wire to illuminate the leash, but rather utilizes a flashlight device. The flashlight acts to illuminate the leash handle by localizing the light beam in the direction the leash is pointed.

U.S. Pat. No. 5,630,382 to Barbera et al. (hereinafter, the '382 patent) discloses an illuminated pet harness having straps with internal cavities that contain fiber optic cores. A plurality of lenses are provided on a top layer of the straps for projecting light when the fiber optic core is illuminated by a light bulb. The '382 patent's illumination device employs fiber optic illumination rather than illumination via an electroluminescent wire device. Furthermore, the invention discloses the illumination of a harness and does not further disclose the illumination of a pet leash.

U.S. Pat. No. 5,762,029 to DuBois et al. discloses a combined retractable leash and flashlight which is an apparatus having a retractable leash and an integral light. The apparatus has a housing section with a handle and a light connected to the top front. A rechargeable battery is removably connected to the housing in the handle. The retractable leash section is pivotally mounted to the housing section. A leash is connected to the reel for extension and retraction relative to the housing section. The retractable leash flashlight combination device does not use an electroluminescent wire for illumination.

U.S. Pat. No. 5,850,807 to Keeler discloses an illuminated pet leash for allowing a pet owner to easily and remotely locate the pet leash. The device includes an elongated non-opaque tube having a bundle of optical fibers longitudinally disposed therein and being illuminated by a remote transponder operable in locating the pet leash. This is not an illuminated leash for walking a dog in a darkened environment. This is a remotely activated pet leash finer and does not use an electroluminescent wire for illuminating a pet leash while a pet is being walked during night-time hours.

U.S. Pat. No. 5,967,095 to Greves (hereinafter, the '095 patent) discloses an illuminated pet leash provided with an elongated strap at one end that is adapted for connection to a collar, and a second end adaptable for forming a handle. A relatively flat and flexible light source is provided along one side of the strap for illuminating the leash. The light source is operated by a power source attached to the strap. The light source is a flat strip of electroluminescene type and may be either permanently or releasably attached to the strap. In another embodiment, the elongated leash strap has two light sources extend along both of its sides. In yet another embodiment, the elongated strap is round in cross-section, and the light source spirals around the circumference of the strap for the extent of the leash. In another embodiment, the illuminated pet leash includes an elongated strap having at least one side, and first and second ends. One end of the strap is attached to a handle having a grip portion and a housing portion with first and second sides. A pair of light sources are positioned on the sides of the housing, and are electrically connected to a power source to illuminate the handle. The pair of light sources are either attached directly to the handle, or to a cover that is attached to the handle. The light sources on the handle or cover are formed in a variety of patterns such as circular, spiral or zig-zag formation. The electroluminescent devices used in the '095 patent disclosure are flat and are generally inflexible in nature, as opposed to an electroluminescent wire which is not disclosed.

U.S. Pat. No. 6,170,968 to Caswell discloses a motion activated rotatable illuminator. The disclosed illuminator has all of its electrical components mounted within a housing that is secured to the rotatable object. Those components include a light source, an electrical power source, a first switch activated by intermittent motion of the housing and a second switch activated by centrifugal forces caused by rotation of the rotatable object. The illuminator components also include a timer which has a timing cycle and which is operably connected relative to the first switch and the second switch such that activation of either the first switch or the second switch initiates that timing cycle of the timer and enables the flow of electricity from the power source to the light source during the timing cycle. The light source can include an electro luminescent strip or light emitting diodes. As noted the illuminator can be mounted on a rotatable object, or can be used by wearing on a person, pet or other device to provide a warning or locator light. The electroluminescent device used is a strip, not an electroluminescent wire and therefore is not very flexible or twistable.

U.S. Pat. No. 6,289,849 to Macedo et al. discloses a device to removably attach a flashlight to a retractable dog leash. The device includes a flexible elongated base member having a top and a bottom side. An elastic member attached to the top side of the elongate member creates an aperture there between for removably inserting a flashlight. Two straps are attached to the bottom of the based member for detachably connecting the elongated base member to a handle of the retractable leash. This flashlight attached pet leash does not use an electroluminescent wire illumination in the pet leash.

U.S. Pat. No. 6,557,498 to Smierciak et al. discloses a night safety pet illumination marker. In this disclosure, a pet collar forms a linearly elongated substrate spine upon which are mounted a series of illumination elements comprising light emitting diodes around the perimeter of collar powered by battery power. A light sensor switch is in series between a power source and the illumination elements breaks the electrical circuit upon sensing of sufficient ambient light levels. The illumination elements may be flashed with a timing circuit. The light emitting diodes may be placed along length of leash controlled by an on/off/automatic switch with light sensor. The patent does not disclose a pet leash, but discloses a diode illuminated collar. Furthermore, the disclosed illuminated collar does not use an electroluminescent wire illumination device, but instead utilizes a diode illumination device.

Numerous patents disclose different types of retroreflectors. However, only those reflective devices that have a flexible nature, and therefore suited for pet leashes, are discussed below.

U.S. Pat. No. 4,763,985 to Bingham discloses a launderable retroreflective appliqué that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides.

U.S. Pat. No. 4,957,335 to Kuney discloses microsphere-based retroreflective articles having high retroreflective brightness at narrow divergence or observation angles, i.e., up to 0.5 degrees. The article made by selection of microspheres having defined combinations of average diameter and average refractive index. This patent teaches (column 4, lines 18-23) that variation in the size of the microspheres will increase the observation angle or divergence angle of the resultant retroreflective article.

U.S. Pat. No. 5,117,304 to Huang et al. discloses a retroreflective article. The retroreflecive article has corner cubes and flexibility. The article can be applied over irregular surfaces by using an optically clear, aliphatic polyurethane polymer. The aliphatic polymer has a plurality of hard chain segments of the formula —$C(O)N(H)$—$C_6H_{10}$—$N(H)C(O)$—.

U.S. Pat. No. 5,200,262 to Li discloses a launderable retroreflective appliqué. The appliqué employs a reflector that comprises elemental aluminum or elemental silver on the backside of the microspheres. The appliqué comprises a monolayer of metal-coated microspheres partially embedded in and partially protruding from a binder layer that comprises a flexible polymer having hydrogen functionalities and one or more isocyanate-functional silane coupling agents. The disclosed flexible polymers include urethane-based polymers such as isocyanate-cured polymers or one or two component polyurethanes and polyols.

U.S. Pat. No. 5,283,101 to Li discloses a launderable retroreflective appliqué which comprises a binder layer formed from an electron-beam curable polymer and typically one or more crosslinkers and silane coupling agents. Electron-beam curable polymers include chlorosulfonated polyethylenes, ethylene copolymers comprising at least about 70 weight percent of polyethylene such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. This appliqué is inverted and light comes through the binder layer.

U.S. Pat. No. 5,777,790 to Nakajima discloses a microsphere-based retroreflective article. The retroreflective article comprises a monolayer of microspheres partially embedded in, and protruding from, a binder layer and specular reflector underlying the microspheres, wherein the monolayer of microspheres comprises a mixture of a first class of microspheres having a first refractive index and a second class of microspheres having a second refractive index wherein the second refractive index is higher than the first refractive index. As a result, the sheeting exhibits superior observation angle angularity.

U.S. Pat. No. 5,962,108 to Nestegard et al. discloses a retroreflective polymer coated flexible fabric material and method of manufacturing the same. The retroreflective polymeric coated flexible fabric material has a retroreflective layer and a polymeric compatibilizing layer welded to a polymeric coated outer surface of a flexible fabric material. The compatibilizing layer provides an intermediate layer between the retroreflective layer and the flexible fabric material, creating suitable bond strength between dissimilar polymers. Flexible fabric materials are polyester, nylon or cotton. The fabric is coated with highly plasticized polyvinyl chloride (PVC) or ethylene acrylic acid copolymer (EAA) that are flexible, durable, and resistant to abrasion. The retroreflective prismatic elements layer include acrylic polymers such as poly(methylmethacrylate); polycarbonates; cellulosics; polyesters such as poly(butyleneterephthalate); poly(ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. The compatibilizing layer that is suitable for bonding between a retroreflective layer and a flexible fabric material include polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. This is a reflective fabric, not a pet leash.

U.S. Pat. No. 5,485,355 to Voskoboinik et al. discloses electroluminescent light sources. A cable-like electroluminescent light source comprises at least two electrodes mutually disposed in such a way as to create between them an electric field when a voltage is applied to them; at least one type of pulverulent electroluminophor dispersed in a dielectric binder and disposed in such proximity to the electrodes as to be effectively excited by the electric fields when created and to emit light of a specific color, and a transparent polymer sheath encasing the electrodes and the electroluminophor.

U.S. Pat. No. 6,400,093 to Baumberg et al. discloses a flexible electro-luminescent light source with active protection from moisture. The substantially flexible, electro-luminescent light source comprises an electrode assembly, dielectric and electro-luminescent layers, with one outer, substantially flexible layer formed of insulating transparent material. The light source is provided with a heating element, and a power supply unit coupled to the electrodes' assembly and to the heating element. The power supply unit selectively operates the electrodes' assembly and the heating element, such as to heat the vicinity of the electrodes' assembly thereby maintaining desired temperature conditions in the vicinity of the light source and thereinside.

Notwithstanding the efforts of prior art workers to construct pet leashes and pet collars that are illuminated by incident light, there remains a need in the art for a flexible pet leash that provides a significant quantum of reliable bright illumination at night-time hours to provide safety when a pet is being walked. A flexible illuminated pet leash, having a robust construction that withstands tensile and torsion forces attending leash usage, has long been needed in the art. Also needed is a flexible, electroluminescent wire illuminated pet leash capable of maintaining high luminosity when subjected to surface abrasion from frictional forces created by contact of the leash with objects having rough exteriors, such as the ground, flooring, posts, trees and the like.

SUMMARY OF THE INVENTION

The present invention provides a flexible pet leash that has an electroluminescent wire, is powered by a portable power supply, and emits a significant quantum of light. The electroluminescent wire is commercially available in several diameters and typically has a diameter of 3.2 mm or 5 mm. The electroluminescent wire is protected from moisture by two coaxial polymeric sleeves. The electroluminescent wire is extremely flexible and can be easily bent to a diameter greater than 5 times the diameter of the wire. The maximum twisting angle is typically 30 degrees per yard of the electroluminescent wire. As a result of this flexure and bending capability, the electroluminescent wire can be spirally wound on the outer perimeter of a flexible braided leash, which may be reflective for added visibility.

The electroluminescent wire illuminated pet leash has a flexible central cylindrical core rope of braided nylon or polypropylene fibers capable of sustaining tensile and torsional forces developed by substantial leash loads. Optionally, in a second embodiment, this braided rope may have cylindrically braided reflective sleeve produced by braiding three or more narrow width reflective strips as disclosed in my copending provisional application bearing, filed of even date herewith, the disclosure of which is incorporated in its entirety by reference thereto. The electroluminescent wire is looped, and preferably spirally wound, around the flexible braided central rope core or in a second embodiment around the cylindrically braided reflective sleeve that covers the flexible cylindrical central core rope to form a continuous lighting wire. One end of the wire is stripped to expose the two copper leads and is soldered to corresponding terminals in the portable power supply that is attached near the handle of the leash. The soldered ends are completely sealed by shrink tubing to prevent moisture damage to the electrophosphoric dielectric within the electroluminescent wire. The power supplied may be operated continuously or turned on and off by a timing circuit to create a blinking effect at a selected blinking rate of the electroluminescent illumination. The electroluminescent wire that is spirally wound may be attached in several places to the flexible braided central rope core, or to the cylindrical braided reflective sleeve, using a polymeric glue or clamp. This attachment prevents the unraveling of the spirally wound electroluminescent wire when the leash is twisted or bent. The electroluminescent wire may be spirally wound around only the central portion of the leash, or may also include spiral winding around the handle. Alternatively the wire can be spirally wound or looped around the handle and a pet collar. The attachment of the pet leash to the pet may comprise a choke collar, electroluminescent wire illuminated choke collar, or a simple clasp connecting to a pet collar that is not illuminated. The electroluminescent wire may be incorporated in a transparent flexible polymeric tube with the end of polymeric tube furthest from the power supply being sealed so as to protect the electroluminescent wire from moisture. This additional transparent polymeric tube provides improved abrasion resistance to the leash and limits damage caused by dragging the leash on the ground while walking a pet.

Optionally a second set of electroluminescent wires may be connected to the power supply and wrapped around the handle of the leash, thereby illuminating the pet owner's hand. In a similar manner, the electroluminescent wire may encircle the portion of the leash that encircles the pet collar illuminating the pet's neck. This illumination method has significant safety advantages, since an oncoming driver during night time hours can easily locate the pet owner, the pet and the leash. The power supply may illuminate the electroluminescent wire surrounding the pet leash and that surrounding the pet owner's hand at different blinking rates for easy identification.

The use of a cylindrically braided reflective sleeve surrounding flexible braided central rope core provides additional illumination of the pet owner, the pet leash, and the collar of the pet. The reflective portion of the cylindrically braided reflective sleeve has bonded retroreflective elements, such as a corner cube retroreflectors or a microsphere retroreflectors, placed over a reflective sheet causing the incident light to be reflected right back to the source. This provides additional light indication in addition to that provided by the electroluminescent wire. While the electroluminescent wire provides illumination at all times when the wire is energized by the battery power, the cylindrically braided reflective sleeve reflects light only when a light, such as a car headlamp, is present. The resultant reflection is only in the direction of the incident headlamp light, while the light emitting electroluminescent wire emanates light in all directions. Advantageously, in all directions other than the direction of incident headlamp light, only the illuminating light produced by the electroluminescent wire is observed.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

The present invention provides a spirally wound electroluminescent wire illuminated pet leash that is flexible, twistable and especially suited for use during dusk or nighttime hours while walking with a pet. Advantageously, leashes constructed in accordance with the invention improve the safety of the pet as well as the pet's owner when walking in dimly lit environments where approaching vehicles are encountered. An integrally formed handle is located on the proximal end of the leash with a power supply attached thereto for driving the illumination of the electroluminescent wire. The power supply may provide continuous voltage to produce continuous illumination or an interrupted timed voltage to produce blinking illumination. The blinking rate may be optionally adjustable by the user.

Unlike other electroluminescent strips, which cannot be readily bent or twisted without destroying the device, the electroluminescent wire of the subject invention can be bent to a diameter greater than 5 times the wire diameter or tolerate a twist of 30 degrees per yard of the electroluminescent wire. Typical diameter of the electroluminescent wire is 3.2 mm or 5 mm, thus accommodating sharp bends. These flexibility features permit the electroluminescent wire to be successfully spirally wound around a flexible central cylindrical rope core of braided nylon or polypropylene fibers. This spiral winding has the advantage that if the flexible central rope braid core is twisted or flexed, the spiral winding accommodates this movement without excessively stressing the electroluminescent wire. The electroluminescent wire may be attached to the flexible central cylindrical rope core at separated locations using polymeric glue or clamps to prevent the unraveling of the spirally wound electroluminescent wire. The electroluminescent wire may be wound around the handle and the pet collar to illuminate the hand holding the leash and the neck of the pet. The electroluminescent wire may be wound around the handle, the central pet leash section, and the pet collar to illuminate the hand holding the leash, the center section of the leash, and the neck of the pet, respectively. The portion of the electroluminescent wire wound around the handle may be powered by the same or a second power source allowing it to blink at a different rate than that of the main pet leash providing a higher level of detectability. In a similar manner, the pet collar may be powered to blink at a different rate.

The flexible central cylindrical braided core rope may optionally be provided with a cylindrically braided reflective sleeve. The cylindrically braided reflective sleeve is created by using a cylindrical braiding process with a shallow braid angle to surround substantially the entire exterior surface of the central cylindrical braided core rope using three or more narrow width reflective strips. The narrow width reflective strips are fabricated from narrow width strips that are braided with nylon or polypropylene fibers to which a reflective flexible sheet with bonded retroreflectors is thermally fused using polyvinyl chloride or polyvinyl acetate glue. The retroreflectors may be corner cube reflectors or microsphere reflectors placed over a reflective sheet. The electroluminescent wire is spirally wound around the cylindrically braided reflective sleeve. The electroluminescent wire may be attached to the cylindrically braided reflective sleeve at separated locations using polymeric glue or clamps to prevent the unraveling of the spirally wound electroluminescent wire. The electroluminescent wire may be also wound around the handle and the pet collar to illuminate the hand holding the leash and the neck of the pet. The portion of the electroluminescent wire wound around the handle may be powered by the same or a second power source allowing it to blink at a different rate than that of the main pet leash providing a higher level of detectability. In a similar manner, the pet collar may be powered to blink at a different rate. This cylindrically braided reflective sleeve underneath the electroluminescent wire reflects any incoming light back to its source over a large range of incidence angles. This feature provides an additional margin of safety to the pet owner and the pet while walking the pet during nighttime hours as compared to that provided by electroluminescent wire illumination solely.

The electroluminescent wire is made from a copper wire, which is surrounded by an electophosphoric dielectric material, such as doped zinc sulfide, and a second set of electrodes are placed on the outer surface of the dielectric. Since the dielectric medium is susceptible to moisture damage, two layers of polymeric coaxial tubes are provided to encase the electroluminescent wire. The wire is sold in long continuous lengths by LyTec and is manufactured by ELAM Electroluminescent Industries Ltd. (Jerusalem, Ill.). A required length of the electroluminescent wire is cut and one end of the wire is stripped to expose the central copper wire and the copper wire surrounding the dielectric. These two wires are attached to corresponding two terminals in the power supply. After the connection is made, the end of the electroluminescence wire is sealed by shrinkable tubing or other means to prevent moisture damage and/or short circuit. The portable power supply accepts batteries of various sizes and converts the DC battery voltage to a AC voltage and transforms it to a AC voltage in the range of 100 to 120. The frequency of the AC voltage can be in the range of 60 Hz to 6 kiloHz. The current levels delivered by the power supply is typically small, less than 100 milliamps, thereby minimizing or eliminating any shock hazard. The voltage requirement to drive an electroluminescent wire is based on the given wire length and wire diameter. Generally, longer wire lengths require a higher voltage. Increasing the frequency of the AC voltage increases the brightness level of light delivered by the eletroluminescent wire. Higher frequency also changes the color of illumination produced by the electroluminescent wire. The brightness achievable by the electroluminescent wire is typically in the range of 32,000 to 45,000 candles per square meter and the illumination is distributed uniformly along the external surface of the wire. The electroluminescent wire typically has a lifetime of 25000 hours of continuous use. The electroluminescent wire is available in a variety of colors and wires of different colors can be soldered together in series providing a multicolored pet leash illumination.

The electroluminescent wire may be additionally protected by encapsulating the wire in a transparent polymeric tube with the end that is furthest from the power supply being permanently sealed. This protects the end of the electroluminescent wire from moisture damage. The transparent polymeric tube also provides abrasion resistance and protects the electroluminescent wire when the illuminated pet leash is dragged on the ground during pet walking.

The power supply may be optionally protected from rain by providing soft buttons and plastic film enclosure of the control buttons. The control button include such indicators as an on/off button, a blinking/steady light button, and blinking rate controls.

Figure 1:
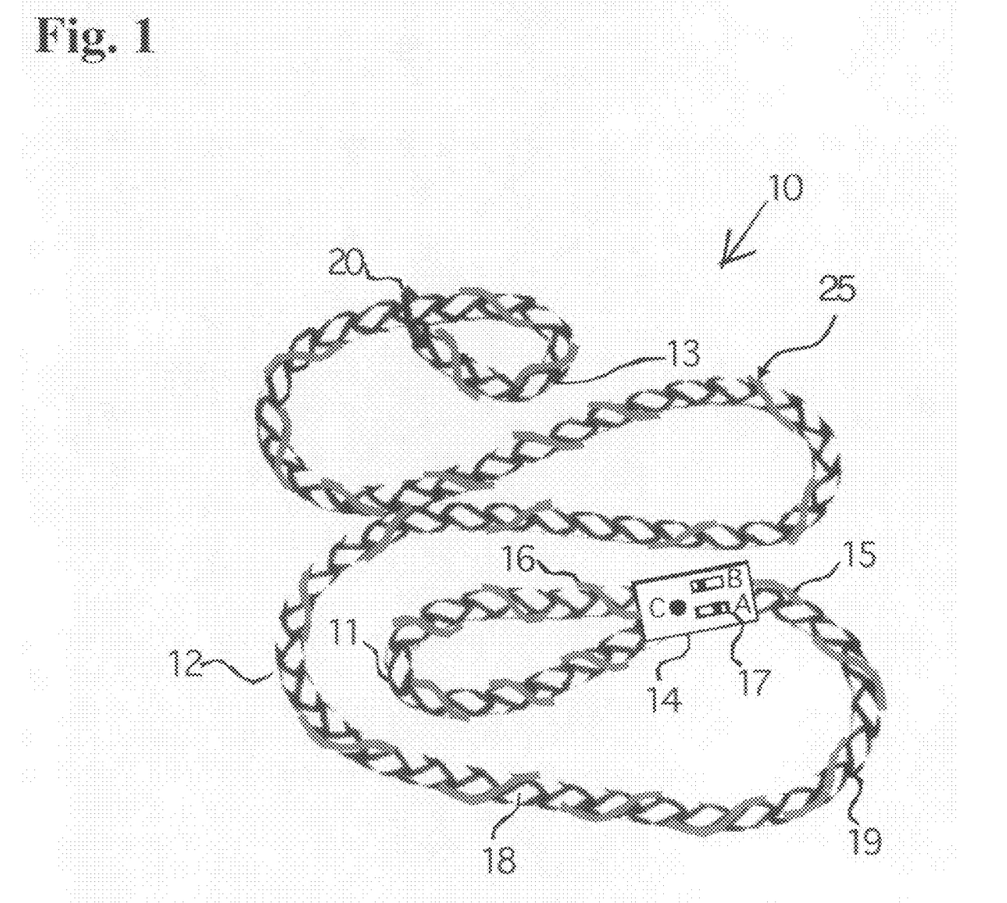
FIG. 1 is a diagram of a wound electroluminescent wire illuminating pet leash showing a leash with a battery powered electroluminescent wire wound around a reflective cylindrical braided sleeve which, in turn, surrounds a central core, and thereby forms an illuminated leash handle, illuminated pet leash central section, and illuminated choke collar section.

FIG. 1 is a diagram of the illuminating pet leash at 10 showing the handle section 11, the central pet leash section 12, and the choke collar section 13. A cylindrically braided sleeve, shown at 25, created from braided narrow width reflective strips, covers each of these sections (11, 12, and 13), providing substantially the entire surface of the leash with omnidirectional reflectivity. The reflective portion of the braided narrow width reflective strip is shown at 18 and the woven portion of the narrow width strip is shown at 19. The leash completely reflects incident light in the same direction as the light was emanated. Due to the cylindrical shape of the cylindrically braided reflective sleeve 25 some portion of the sleeve is always at normal orientation to the incoming light beam, that is, the direction at which the reflection from the retroreflective elements is the maximized. Retroreflective elements reflect light over a large range of acceptance angles, but the reflection is at a lower intensity. This cylindrical construction effectively reflects the incoming camera flash light as shown in the diagram of FIG. 1 by the extremely bright appearance of the retroreflectors bonded to the flexible polymer comprising the braided narrow width reflective strip and making up the reflective portion 18 in the leash.

An electroluminescent wire is spirally wound around the cylindrically braided sleeve as shown at 15. In this figure, the handle is also spirally wound with elctroluminescent wire as shown at 16. A portable power supply box 14 is attached to the handle to provide AC power to the electroluminescent wire. The power supply carries batteries and the control functions indicated as 17, that may include: control A for turning the electroluminescent wire on or off; control B to turn the blinking function on/off; and control C, a blink rate control. These controls may be repeated as a separate set (not shown) to control the electroluminescent wire spirally wound around the handle. The distal end is shown as a choke collar (optionally the collar may be a non-choke collar) that also has the electroluminescent wire spirally wound around the cylindrically braided sleeve and the leash passes through a mechanical hardware metallic ring 20 of the collar.

Figure 2:
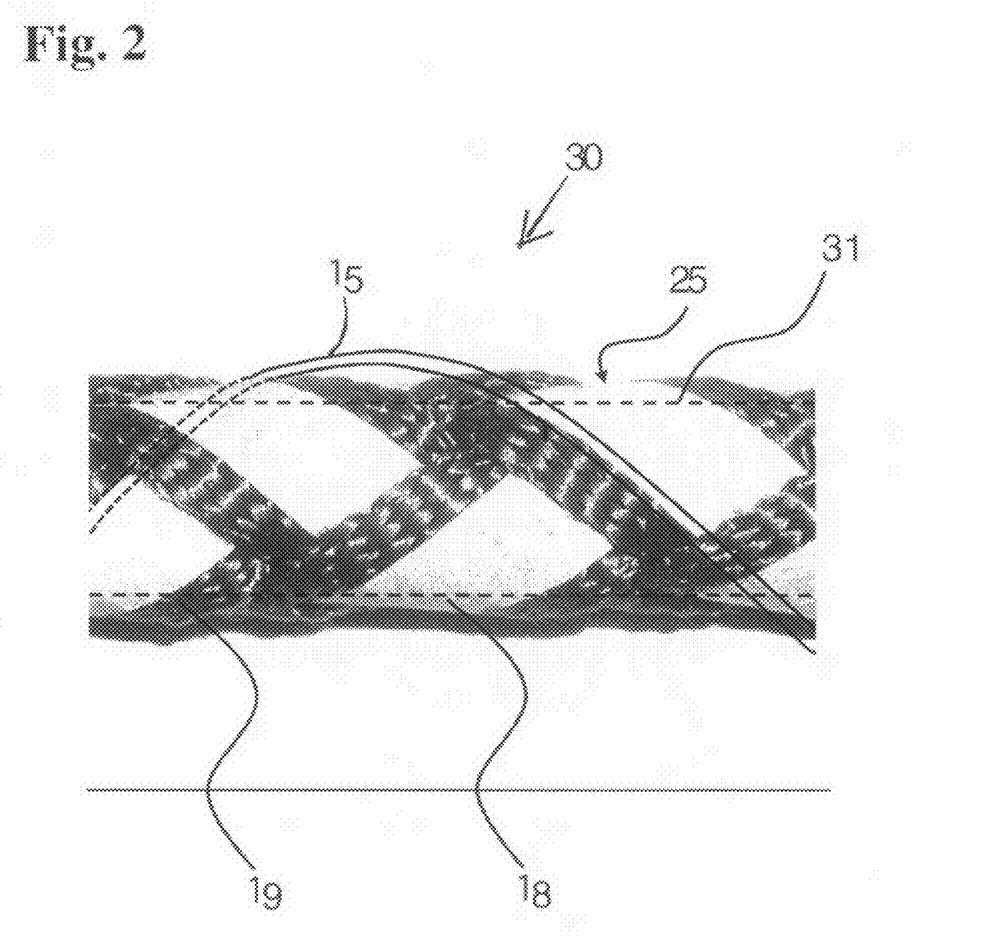
FIG. 2 is a magnified sectional of the wound electroluminescent wire illuminating pet leash of FIG. 1, illustrating the reflective cylindrical braided sleeve of narrow width strips surrounding the central core.

FIG. 2 is a magnified sectional view of the wound electroluminescent wire illuminating pet leash of FIG. 1, illustrating the reflective cylindrical braided sleeve of narrow width strips surrounding the central core, shown generally at 30. The cylindrical reflective braided sleeve 25 surrounds the central core, shown at 31. The cylindrical reflective braided sleeve 25 is created from braided narrow width reflective strips and covers each of the leash sections (11, 12, and 13 of FIG. 1), providing substantially the entire surface of the leash with omnidirectional reflectivity. The reflective portion of the braided narrow width reflective strip is shown at 18 and the woven portion of the narrow width strip is shown at 19. The electroluminescent wire 15 is spirally wound around the cylindrically braided sleeve 25.

The key features of the illuminated pet leash include, in combination, the features set forth below:

1. a spirally wound electroluminescence wire illuminated pet leash comprised of a flexible central cylindrical rope core of braided nylon or polypropylene fibers capable of sustaining tensile forces developed by pet leash loads;
2. the pet leash having an integrally formed handle and provisions for a choke collar or clasp connection to a conventional (or non-choke) pet collar;
3. an electroluminescent wire spirally wound around the braided central cylindrical rope core illuminating the leash when connected to power supply;
4. the spirally wound electroluminescent wire optionally attached to the central cylindrical rope core at separate locations using a polymeric glue or clamps to prevent unraveling of the electroluminescent wire when the pet leash is twisted;
5. the braided central cylindrical rope core optionally covered substantially with a cylindrically braided reflective sleeve formed by cylindrically braiding narrow width reflective strips of knitted, woven or braided nylon or polypropylene strips which have thermally bonded flexible retrorefletors sheets attached thereto;
6. the spirally wound electroluminescent wire is optionally attached to the cylindrically braided reflective sleeve at separate locations using a polymeric glue or clamps to prevent unraveling of the electroluminescent wire when pet leash is twisted;
7. an electroluminescent wire spirally wound around the cylindrically braided reflective sleeve illuminating the leash to provide omnidirectional illumination when connected to an active power supply;
8. the handle permanently attached to a AC power supply providing voltage for continuous or controlled rate of blinking of electroluminescent wire;
9. the electroluminescent wire being protected from moisture by a transparent polymeric tube with closed distal end that is further from the power supply;

10. the pet leash handle having a spirally wound electroluminescent wire and illuminating continuously or blinking at a rate that is the same or different from that of the main pet leash;
11. the pet choke collar having a spirally wound with electroluminescent wire and illuminating continuously or blinking at a rate that is the same or different from that of the main pet leash;
12. the flexible retroreflector sheet prepared by bonding corner cube geometry retroreflectors to a flexible polymeric sheet using a transparent binder;
13. the flexible retroreflector sheet prepared by bonding microsphere geometry retroreflectors to a metallized reflective flexible polymeric sheet using a transparent binder;
14. the cylindrical reflective braid sleeve covered pet leash substantially reflecting incident light back in the same direction as the incident light, providing a clear indication of the pet leash handle, pet leash central portion and the pet leash collar surrounding the neck, in addition to the illumination provided by the electroluminescent wire;
15. the spirally wound electroluminescence wire illuminated pet leash providing an increased margin of safety for the pet owner and the pet while walking in dimly lit environments, such as parking garages, or inclement weather conditions, where rapidly moving vehicles are encountered.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An illuminated pet leash, comprising:
   a. a central cylindrical braided rope core having a distal end, a central section, and a proximal end and being operable to sustain substantial tensile forces;
   b. said central cylindrical braided rope core being looped to form a handle at said proximal end;
   c. said distal end of said central cylindrical braided rope core being adapted for attachment to a mechanical hardware component appointed for connection to a pet collar;
   d. an electroluminescent wire connected to a power supply operable for illuminating said electroluminescent wire, said electroluminescent wire being encased by two layers of polymeric coaxial tubing;
   e. a cylindrical reflective braided sleeve comprising three or more narrow width reflective strips that are braided at a shallow braid angle relative to the longitudinal axis of the central cylindrical braided rope core, said cylindrical reflective braided sleeve being operable to surround said central cylindrical braided rope core thereby providing omnidirectional reflectivity to said illuminated pet leash when a light source reflects therefrom;
   f. said handle having an attached power supply for illuminating said electroluminescent wire;
   g. said electroluminescent wire being wound around said cylindrical reflective braided sleeve and functioning to provide omnidirectional illumination to said illuminated pet leash when said power supply is operated;
   h. said narrow width reflective strips comprise a flexible retroreflective sheet thermally bonded to narrow width strips having a woven or braided construction and being composed of nylon or polypropylene fibers with polyvinyl chloride or polyvinyl acetate; said flexible retroreflective sheet having retroreflectors bonded thereto with a transparent bond layer;
   i. wherein said cylindrical reflective braided sleeve surrounds said handle and said pet collar, and said electroluminescent wire surrounds said handle and said pet collar;
   whereby said electroluminescent wire illuminates the pet leash when powered by said power supply and said cylindrical reflective braided sleeve reflecting incident headlamp light back to the light source.

2. An illuminated pet leash as recited in claim 1, wherein said central cylindrical braided rope core comprises braided nylon fibers.

3. An illuminated pet leash as recited in claim 1, wherein said central cylindrical braided rope core comprises braided polypropylene fibers.

4. An illuminated pet leash as recited by claim 1, wherein said power supply illuminates said electroluminescent wire and provides continuous voltage.

5. An illuminated pet leash as recited by claim 1, wherein said power supply illuminates said electroluminescent wire and provides blinking voltage at a preselected blink rate.

6. An illuminated pet leash as recited by claim 1, wherein said power supply illuminate said electroluminescent wire and provides blinking voltage at a first blink rate for said central section and a second blink rate for said handle of said central cylindrical braided rope core.

7. An illuminated pet leash as recited by claim 1, wherein said electroluminescent wire is attached to said cylindrical reflective braided sleeve with a polymeric glue or clamp.

8. An illuminated pet leash as recited by claim 1, wherein said electroluminescent wire is protected by a transparent polymeric tube having a closed end located at a point furthest from the power supply.

9. An illuminated pet leash as recited by claim 1, wherein said electroluminescent wire has a diameter of 5 mm.

10. An illuminated pet leach as recited by claim 1, wherein said mechanical hardware component comprises a clasp for connecting a pet collar.

* * * * *